United States Patent
Granzeier et al.

(10) Patent No.: US 7,588,211 B2
(45) Date of Patent: Sep. 15, 2009

(54) BAGGAGE COMPARTMENT IN PASSENGER TRANSPORT SYSTEM

(75) Inventors: Werner Granzeier, Jork (DE); Andreas Wietzke, Hamburg (DE); Jan Schroeder, Hamburg (DE)

(73) Assignee: Airbus Deutschland GmbH, Hamburg (DE)

(*) Notice: Subject to any disclaimer, the term of this patent is extended or adjusted under 35 U.S.C. 154(b) by 426 days.

(21) Appl. No.: 11/265,666

(22) Filed: Nov. 2, 2005

(65) Prior Publication Data

US 2006/0157620 A1    Jul. 20, 2006

Related U.S. Application Data

(60) Provisional application No. 60/643,318, filed on Jan. 12, 2005.

(30) Foreign Application Priority Data

Nov. 3, 2004    (DE) .................. 10 2004 053 140

(51) Int. Cl.
 *B64D 11/00*    (2006.01)

(52) U.S. Cl. .................................................. 244/118.5

(58) Field of Classification Search .............. 244/118.5, 244/118.1, 117 R; 312/269, 266, 247, 248
See application file for complete search history.

(56) References Cited

U.S. PATENT DOCUMENTS

| | | | |
|---|---|---|---|
| 4,637,642 A * | 1/1987 | Stoecker | 292/129 |
| 5,244,269 A | 9/1993 | Harriehausen et al. | |
| 5,746,466 A * | 5/1998 | Antos et al. | 296/37.1 |
| 5,823,472 A * | 10/1998 | Luria | 244/118.1 |
| 5,839,694 A | 11/1998 | Bargull et al. | |
| 5,868,353 A * | 2/1999 | Benard | 244/118.1 |
| 5,922,437 A * | 7/1999 | Bryant | 428/102 |
| 6,527,325 B2 * | 3/2003 | Steingrebe et al. | 296/37.7 |
| 2002/0030139 A1 | 3/2002 | Apel et al. | |
| 2003/0026940 A1* | 2/2003 | Bullock | 428/99 |
| 2003/0080247 A1* | 5/2003 | Frazier | 244/118.1 |
| 2006/0214055 A1* | 9/2006 | Novak et al. | 244/118.5 |

FOREIGN PATENT DOCUMENTS

| | | |
|---|---|---|
| EP | 799767 A2 | 10/1997 |
| EP | 1197621 A1 | 4/2002 |

* cited by examiner

*Primary Examiner*—Tien Dinh
(74) *Attorney, Agent, or Firm*—Christopher Paradies; Fowler, White, Boggs P.A.

(57) ABSTRACT

A baggage compartment includes a housing that has a baggage accommodation space, a hinged cover, a latching mechanism, an operating element and a covering element. By moving the hinged cover, the baggage accommodation space may be selectively made accessible or inaccessible. The latching mechanism may be partly placed on the hinged cover in such a way that the hinged cover and the housing may be selectively latched or unlatched by utilizing the operating element. The covering element is placed on the hinged cover such that it covers the latching mechanism but leaves the operating element accessible to the user for operation.

21 Claims, 10 Drawing Sheets

BAGGAGE COMPARTMENT IN PASSENGER TRANSPORT SYSTEM

RELATED APPLICATIONS

This application claims the benefit of the filing date of German Patent Application No. 10 2004 053 140.4 filed Nov. 3, 2004 and claims the benefit of the filing date of U.S. Provisional Patent Application No. 60/643,318 filed Jan. 12, 2005, the disclosure of which is hereby incorporated herein by reference.

FIELD OF THE INVENTION

The field relates to baggage compartments used in passenger transport systems such as vehicles of transport.

TECHNOLOGICAL BACKGROUND

Increasing customer demands and a need for an individual corporate identity are all factors influencing the design of an interior cabin.

Cabin compartments in a passenger aircraft are subject to a fixed sequential process of development, manufacturing of the compartments, certification and installation of them and thus require considerable investment in money and time. As customized cabins are now subject to shorter production cycles, such a delay is often not acceptable.

U.S. Pat. Nos. 5,839,694 and 5,244,269 each disclose, a hat rack, i.e., an overhead baggage compartment in the passenger section of an aircraft. In general, baggage compartments in an aircraft cabin include a housing and a hinged cover which may be latched. In the case of movable bins, they have a combination of a housing and hinged cover. The housing and hinged cover frequently include composite materials such as glass fiber reinforced plastic (GFRP) or carbon fiber reinforced plastic (CFRP) for forming outer layers and fibers such as Aramid fibers for forming a honeycomb core. In a hinged cover, a latch such as one constructed from a lever mechanism or a latching mechanism may be installed into a recess.

In an overhead baggage compartment, which has increasingly become enlarged in volume due to increased passenger traffic, the load capability of the hinged cover, and particularly, the latch, have to adapt in order to cope with increased weight demands. However, recesses and openings in a fiber structure reduce the strength of the baggage compartment and limits its maximum interior volume. In order for a latch to be placed in a baggage compartment, the recesses often have to made of similar composite material.

Frequently, such a latch includes a guide rod that operates on a latching mechanism. Such a rod extends along the inside of a movable bin and separately covers the baggage in order to protect it. However, this increases weight in an aircraft cabin. Furthermore, a latch having a covered rod leads to the tendency of the loading surface of the baggage compartment of being uneven in shape. Additionally, the exposed region of the latch may increase the chances of an injury to passengers.

SUMMARY OF THE INVENTION

A baggage compartment may include a housing that comprises a baggage accommodation space, a hinged cover, a latching mechanism, an operating element and a covering element. By moving the hinged cover, the baggage accommodation space may be selectively made accessible or inaccessible. The latching mechanism is at least partly placed onto the hinged cover in such a way that the hinged cover and the housing may be selectively latched or unlatched by activating the operating element. The covering element is placed onto the hinged cover such that it covers the latching mechanism and leaves the operating element accessible for operation. Furthermore, a baggage compartment comprising the above-mentioned features may be utilized in passenger transport systems, such as vehicles of transport which include aircraft.

The method may include forming a housing with a baggage accommodation space, mounting a hinged cover on the baggage accommodation space and moving it in such a way that the baggage accommodation space becomes selectively accessible or inaccessible; and placing a latching mechanism partly onto the hinged cover in such a way that the hinged cover and the housing are selectively latched or unlatched via the operation of an operating element. Furthermore, in the method, a covering element may be mounted onto the hinged cover such that it covers the latching mechanism and leaves the operating element accessible for operation.

Furthermore, a system of use of a baggage compartment, with the above-mentioned features, may be used in passenger transport systems such as vehicles of transport.

In another embodiment, a corresponding part of a latching mechanism may be placed onto a covering area of a hinged cover from the outside without integrating the latching mechanism in a recess in the hinged cover and/or in the housing. Integration, on the other hand, may prove to be an expensive process.

The latching mechanism which is placed onto the hinged cover (for example, by gluing, riveting or screwed) is covered by a covering element, which shields it from the outside, and may prevent its sharp edges, when applicable, from causing injury to passengers. Thus, improved safety in a baggage compartment is provided. While the covering element may cover the latching mechanism, it nevertheless may leave the operating element exposed (for example, by means of a recess in a covering area of the covering element) such the operating element may be operated from the outside. There is no need for an expensive covering structure as the covering element is easier to manufacture and has lowered production costs.

Furthermore, apart from its protective function and safety function, the covering element may simultaneously be customized to include a customized element, such as an individual corporate identity design that identifies a particular business. Thus, a decorative element, depending on the needs of the customer, may be placed on a standardized baggage compartment without requiring expensive recertification.

In the case of a baggage compartment without a movable bin, such as a hinged hat rack cover or a vertically movable bin having a chute, a hat rack cover may be attached on the outside and is covered by the covering element.

In one embodiment, the hinged cover or the vertically movable bin having a chute may be made with fibers that do not require openings for the installation of the latch. This may lead to improved strength, reduced re-work of the compartment and lowered costs. Additionally, the hinged composite material may have increased strength and may have greater safety in case of a crash.

Since the covering component, namely the covering element, may not have a structural function (it is usually the housing that has such a structural function), it may be economically produced in almost any desired shape. By using soft base materials, the covering element may offer additional protection against accidents or air turbulence by absorbing some of the impact that occurs when a passenger runs into the baggage compartment, for example, during such situations.

The covering element of the baggage compartment according to one embodiment of the invention, provides an economical option of implementing different variations of a cabin design. By adapting/changing the covering element, completely different cabin compartments which are visually appealing to passengers may be realized. Thus, apart from its function in covering a latch, the covering element is also visually appealing because it may be adapted to suit customer-needs and additionally, have aesthetic-functional elements, such as an image display device or a loudspeaker, integrated into it.

Furthermore, the form, color, as well as additional technical elements of a covering element in a standard cabin may be adapted to suit individual customer requirements and since the covering element need not require additional certification, the cabin may quickly and cost-effectively be adapted to suit customer requirements.

In the case of leased or used vehicles of transport, the cabins may be adapted to suit customer needs without requiring major modifications and corresponding new certification, because the placement of the covering element on the hinged cover may be changed by personnel without any special training, and due to the low cost involved, the covering element may be changed more frequently.(e.g., the cabin may be changed depending on the season, such as summer or winter.)

Thus, as part of an interior development of passenger transport systems, which include a vehicle of transport (for example, a coach, train, a ship or an aircraft), a hinged hat rack cover, an example of a baggage compartment, may be provided with additional components and may be covered with customer-specific decorative covering or may include a corresponding structural color or technical equipment. The customer-specific covering component may also include special effects, such as LED light effects or innovative materials and new materials, for example.

Before the outside surface of a baggage compartment is adhered on or clipped on, the entire closure mechanism (or a portion thereof) such as a latching mechanism may be installed on the base component such as a housing, for example.

For example, variations of lateral hat racks with upward-opening hinged covers and baggage compartments with vertically moving chutes may be used. Additionally, the covering components may include sensor systems that allow the hat racks to open without touch. Thus, multiple modification of the interior covering components within the product cycle in excess of 20 years may thus become easily achievable and adaptable to the particular contemporary technical standards and to changing market requirements.

Two-dimensional or three-dimensional additional components of any desired surface geometry may be used in baggage compartments that include hinged rack covers and baggage compartments having chutes. The installation of such shaped components for example, may be mounted by means of gluing, clipping, ultrasonic welding, plugging or connecting to the respective base component of the baggage compartment, such as a housing, for example. Integrating and covering the closure mechanisms and the base component of the baggage compartment may take place without edge sealing. The additional components may include additional customer-specific functions such as a row of light emitting diodes, sensor systems for non-contact functions, translucent materials and/or tactile materials. Moreover, additional components may include technical devices such as information screens displaying seat numbers, optical materials that change color, dirt-repelling surfaces and sound-carrier integration (for example, loudspeakers). Changing and modifying older assemblies and existing hinged cabin hat rack covers becomes possible with little effort and expense. The additional components may be manufactured with different color and surface variations.

To provide improved accident prevention in the case of turbulence, components of the baggage compartment may also be made from soft materials.

The baggage compartment may be a hinged hat rack cover, i.e., an overhead baggage space, in passenger transport systems such as vehicles of transport. The baggage compartment may be designed such that the baggage accommodation space may be made accessible by vertically moving the components of the baggage compartment such as a hinged cover. In other embodiments, baggage compartments may include baggage compartments with vertically lowered chutes and/or housings for accommodating baggage items. Alternatively, the housing may be immovable in vertical direction such that the baggage accommodation space is made accessible by hinging the cover. The hinged cover with the covering element in place may be opened in order to allow for placement of an item of baggage from the front side into the baggage accommodation space.

The latching mechanism may be selected from a group comprising a hook mechanism, a snap-lock mechanism, a tong-type mechanism and a magnetic closure mechanism. However, any type of latching mechanism may be provided, and includes a latching mechanism with exposed components such as sharp edges because the covering element may shield such a latching mechanism from the surroundings.

The operating element may include a push button or a non-contact operable sensor. In the case of a push button, operation of the push button, for example, may result in a rod of the latching mechanism being mechanically moved such that the baggage compartment is opened or closed. In an operating element that includes a non-contact sensor, the baggage compartment may be opened without involving contact.

The covering element may include a recess through which an operating element protrudes; thus, the operating element may be operated from the outside by the user. The use of a recess may enable the operating element, which may extend from the hinged cover positioned underneath the covering element, to be more accessible to a user. Additionally, the recess' visibility may make it easier for the user to recognize the operating element.

Alternatively, a depression in the covering element may be provided and in which the operating element may be arranged. Like the recess, the depression is easily visible and may make it easier for the user to intuitively find the operating element.

The latching mechanism may be partly placed on the housing. Thus, part of the latching mechanism (for example, a pin or bolt of a hook mechanism) may be placed on the housing. Another part of the latching mechanism (for example, a guide rod and/or a lever hook of a hook mechanism) may be placed on the hinged cover and/or may be arranged between the hinged cover and the covering element so as to effect latching of the hinged cover on the housing.

The covering element may include a surface region that faces away from the hinged cover (i.e. the portion that faces a user), and may be of a three-dimensional curvature. There are no limits to the type of design of the three-dimensional surface structure, such as the curvature with different curve regions. Thus, the covering element, in addition to offering protection and safety, may be aesthetically pleasing to the user. The covering element of the baggage compartment may include a decorative design element. For example, the decorative design element may feature an individual design that refers to an particular business such as a corporate logo and/or trademark. In other words, a standard baggage compartment may adopt a corporate indicator of identity such as a logo, trademark, slogan, and may be economically manufactured in large quantities.

The covering element of the baggage compartment may be placed on the hinged cover without serving as a support. The housing of the baggage compartment may have a supporting function instead. Thus, limitations need not be considered in the design of the covering element.

The covering element may be provided from a soft material, such as a foam or a special honeycomb structure. The use of soft materials may provide additional protection against injuries because they may absorb much of impact that occurs when a passenger runs into a baggage compartment during air turbulence for example, and also enhances the aesthetic appearance of the baggage compartment.

The covering element may comprise at least one illumination element. Such an illumination element may include an LED or an arrangement comprising several LEDs, or an emergency exit sign. In another example of an illumination element, a reading light for a passenger who is seated underneath the baggage compartment may be integrated into the covering element.

The covering element may be attached to the hinged cover in various ways such as from the group consisting of an adhesive connection, a clip-on connection, an ultrasonic-welding connection and a plug-type connection. Thus, the covering element may be reversibly attached to the hinged cover. This allows for economic installation, maintenance and ease of removal of the covering element.

The covering element may be made from a material from the group consisting of a translucent material, a tactile material, and a material with variable optical characteristics. In other words, the covering element may be designed such that it appeals to any one of the human sensory perceptions, such as those that appeal to the visual, tactile and/or olfactory senses.

Furthermore, the covering element may include an electronic display device or an acoustic playback device. For example, a liquid crystal display (LCD) may be integrated in the covering element, and may provide passengers with information, and/or may be used as part of a passenger entertainment system.

In the following, one embodiment also applies to the baggage compartment, the aircraft and the method for producing the baggage compartment. In one embodiment, the baggage compartment may be used in a passenger transport systems which may include vehicles of transport, such as an aircraft. In another embodiment, a baggage compartment may provide improved protection against injury and may prove more economical to produce.

Other advantages may include the baggage compartment's effective safety features, economical design and the ability to suit specific customer needs such as displaying a corporate logo or changing design such as color, style for specific seasons such as winter. Such advantages may be particularly valuable in a passenger transport system which may include vehicles of transport, such as coach, train, ship, etc., or an aircraft.

BRIEF DESCRIPTION OF THE DRAWINGS

Examples of the invention are shown in the figures and are described in more detail below.

The following are shown.

DETAILED DESCRIPTION OF PREFERRED EMBODIMENTS

Figure 1:
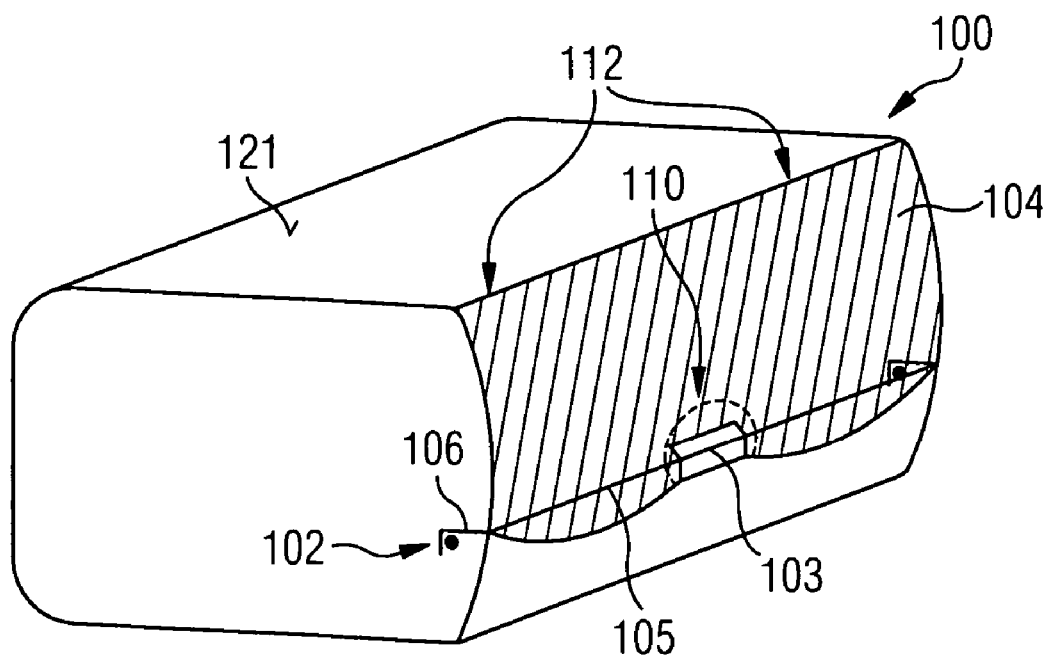
FIG. 1 is a perspective view of a baggage compartment according to a first embodiment of the invention.

The illustrations in the figures are diagrammatic and not to scale. Identical or similar components in different figures share the same reference characters.

Below, with reference to FIG. 1 and FIG. 2, a baggage compartment 100 according to a first embodiment of the invention, is depicted.

Figure 2:
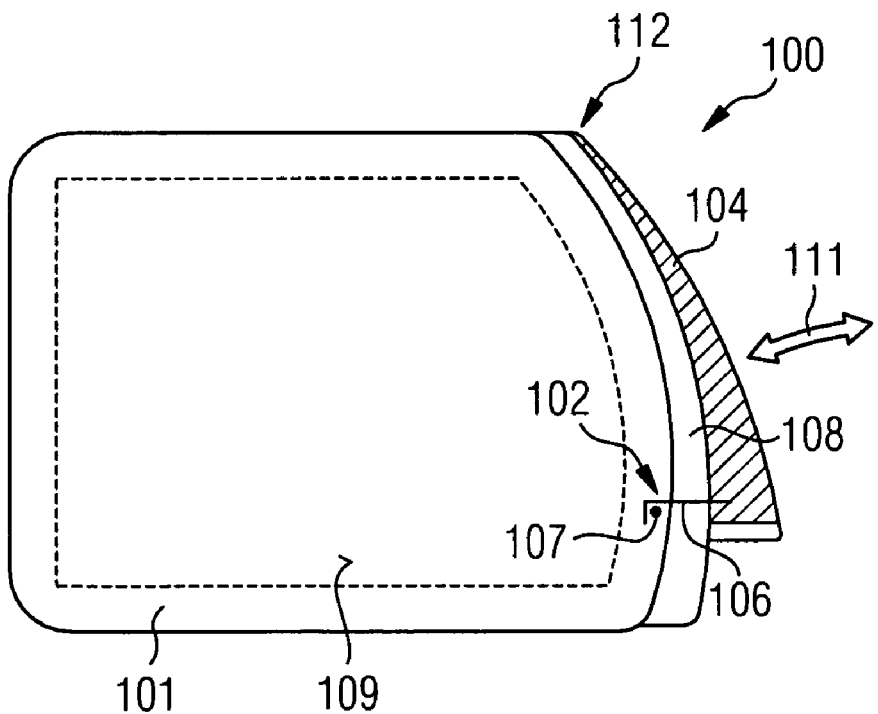
FIG. 2 is a cross-sectional view of the baggage compartment according to the first embodiment of the invention.

As shown in FIGS. 1 and 2, which each depicts different views, a baggage compartment 100 includes a housing 101 with a baggage accommodation space 109, and further comprises a hinged cover 108, a latching mechanism 102 (with a guide rod 105, a lever hook 106 and a pin 107 on the housing 101), an operating element 103 and a customised covering element 104. The hinged cover 108 also is shown in a hinge position 112 in FIGS. 1 and 2.

By moving the hinged cover 108 along a direction 111, the baggage accommodation space 109 may be selectively made accessible or inaccessible to an user.

An user who utilizes the operating element 103, (in one example, the operating element is a handle in which the rod 105 may be turned.) may thus open the latching mechanism 102 such that the hinged cover 108 as well as the customized covering element 104 placed on the cover, moves away in a direction 111. Thus, in one example, the passenger gains access to the baggage accommodation space 109.

The latching mechanism 102 may be partly placed on the hinged cover 108 in order to for the hinged cover 108 and the housing 101 together to be selectively latched or unlatched by using the operating element 103. In one example, the latching mechanism 102 in FIG. 1, uses a CE guide rod 105, which is movable via the operating element 103, and may be latched or unlatched via the use of a lever hook 106 and a pin 107. In one example, the covering element 104 may be placed on the hinged cover 108 in such a way that it covers the latching mechanism 102 (in particular, the guide rod 105, as well)

while leaving the operating element 103 accessible from the outside so that it may be operated by a user.

In one example, the baggage compartment 100 is a hinged hat rack cover, wherein the baggage compartment 100 has a fixed floor such as a fixed bin. In one example, the housing 101 is immovable in a vertical direction and is suspended in a passenger compartment of an aircraft such that access to the baggage accommodation space may be allowed via the operating element 103.

In one example, the latching mechanism according to FIG. 1 has a hook mechanism which includes a rod 105, a hook 106 and a pin 107. The operating element 103, in one example, is a push-button. The covering element 104, in one example, may include a depression 110 in which the operating element 103 is arranged such that a user may intuitively find the operating element 103. The rod 105 and the hook 106 are attached to the hinged cover 108, while the pin 107 is attached to the housing 101. In a surface region which faces away from the hinged cover 104, the covering element 104 may have a three-dimensional curvature which also includes the depression 110.

The customised covering element 104 may include a decorative surface design which may be suited to fit corporate customer needs such an airline or includes elements that may identify a particular business. In one example, the customized covering element may have different variations in color such that passengers recognize a particular airline, which may have a trademark that is distinctive in color. Thus, an informed user, may recognize that the baggage compartment 100 with the customized covering element 104 identifies a particular airline, for example.

In one example, the covering element 104 may not have a structural function and is attached to the hinged cover 108. In one example, the covering element may be made of soft material that may reduce the likelihood of injury to a passenger, who may be thrown against the baggage compartment in case of a crash or air turbulence.

As illustrated in FIG. 1, a latch mechanism 102 is integrated into the customised covering element 104. In such an example, a rod 105 that operates the latching mechanism is guided along a surface of the covering element that is in direction away from the user (for example, direction between the customized element 104 and the hinged cover 108.) and is not visible to the outside user. In one example, the latch mechanism 102 employs a lever hook 106. In other examples, a tong-type mechanism or a snap-lock mechanism may be used.

Figure 3A:
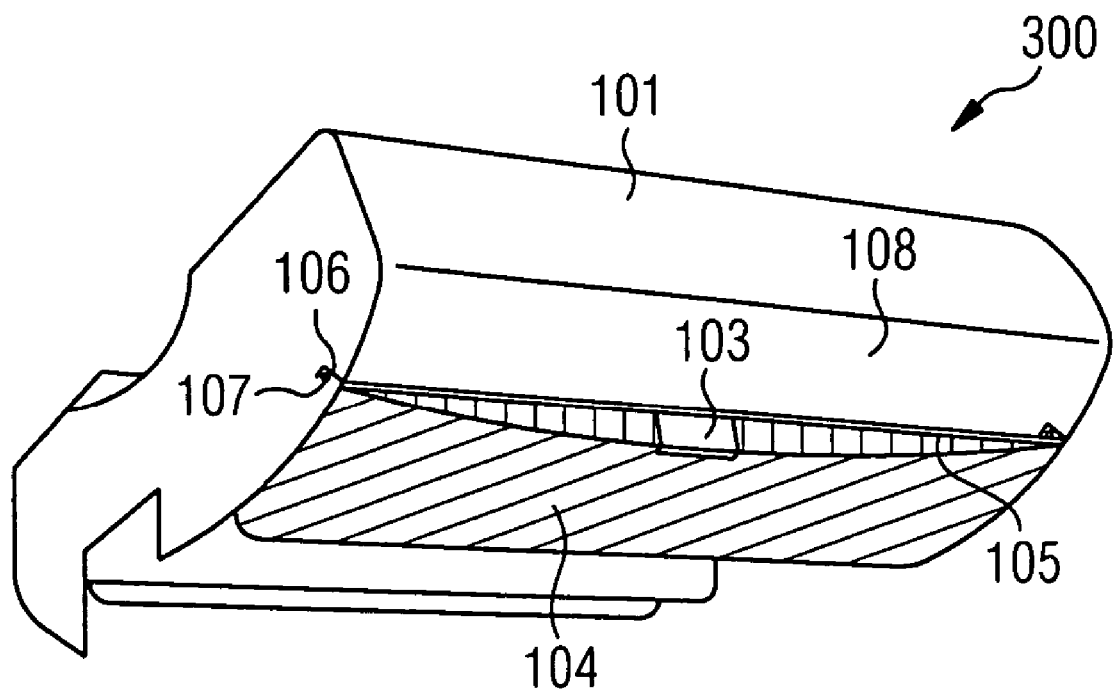
FIG. 3A is a perspective view of a baggage compartment according to a second embodiment of the invention.
Figure 3B:
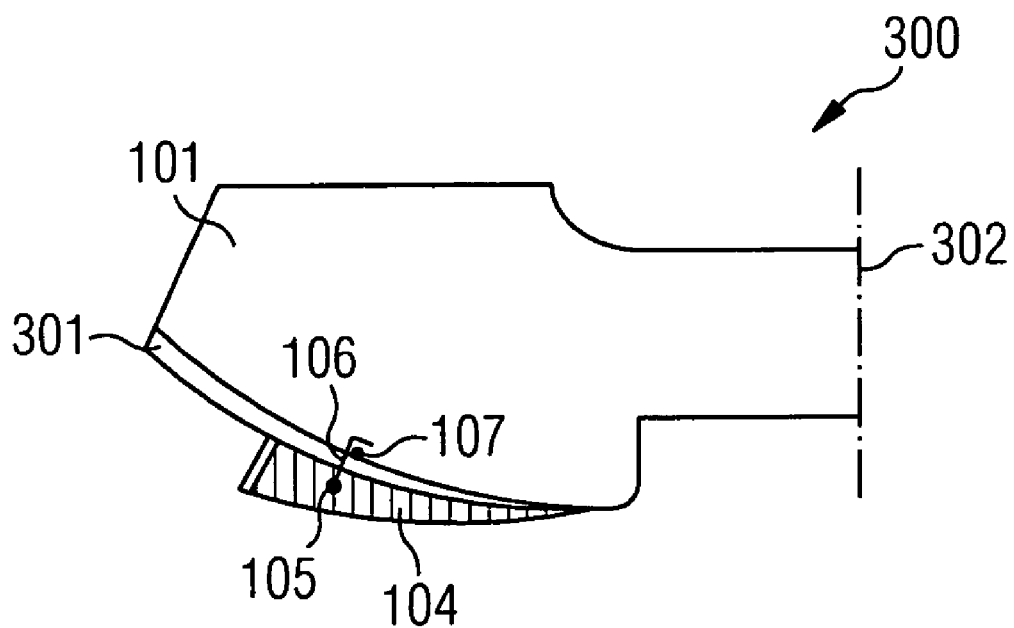
FIG. 3B is a cross-sectional view of the baggage compartment according to the second embodiment of the invention.
Figure 4A:
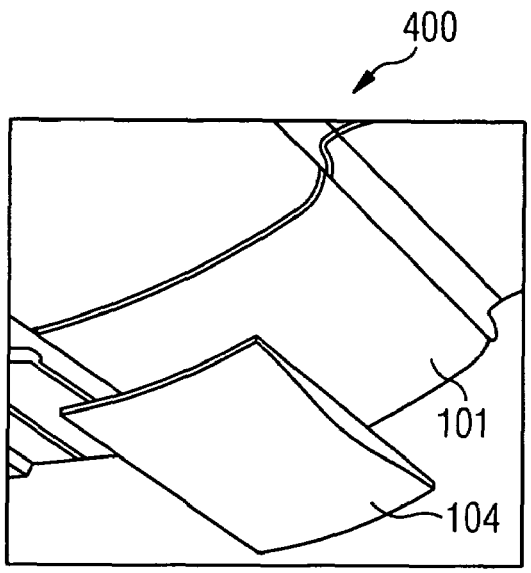
FIGS. 4A to 4D are perspective views of baggage compartments according to the third to sixth embodiments of the invention.
Figure 4B:
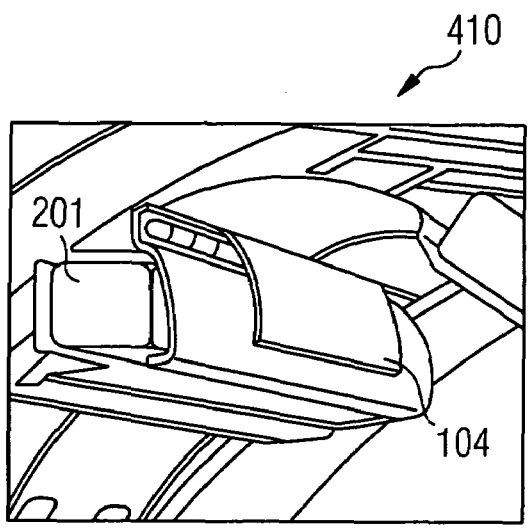
Figure 4C:
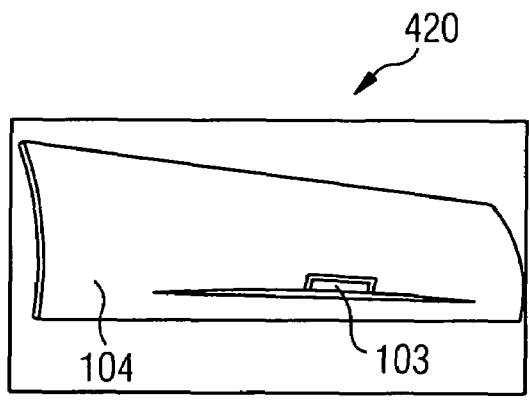
Figure 4D:
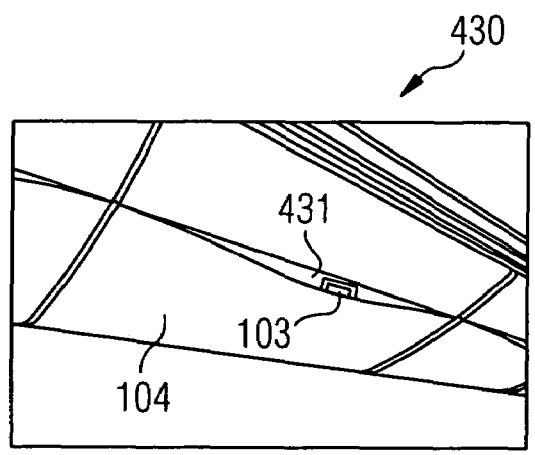

In FIGS. 3A-B, a baggage compartment 300 includes a vertically movable bottom such as a movable bin. An user who vertically moves some of the components of the baggage compartment may make a hollow baggage accommodation space accessible. In one example, the baggage compartment 300 is a hat rack that may be vertically lowered. In such a hat rack, a customized covering element 104 covers a latching mechanism or a hat rack closure which is attached on the outside. A chute 301 of the baggage compartment 300 may be lowered via the operating element 103 in order to make a baggage accommodation space (not shown) accessible to a user. A pin 107 may be attached to a baggage compartment housing 101.

In FIGS. 3A-B, the latch mechanism includes other components, such an operating element 103, a rod 105, a lever hook 106 and a pin 107. Furthermore, a symmetry axis 302 along the baggage compartment 300 is depicted.

In FIGS. 4A to 4D, perspective views of baggage compartments 400, 410, 420, 430 according to the third to sixth embodiments of the invention are depicted. For example, the baggage compartment 430, includes a curvature 431, a three-dimensional surface structure, In another example, the customized covering element may include a decorative foil which has been adhesively placed onto it by glue. Other adhesive mechanisms are contemplated.

Figure 5:
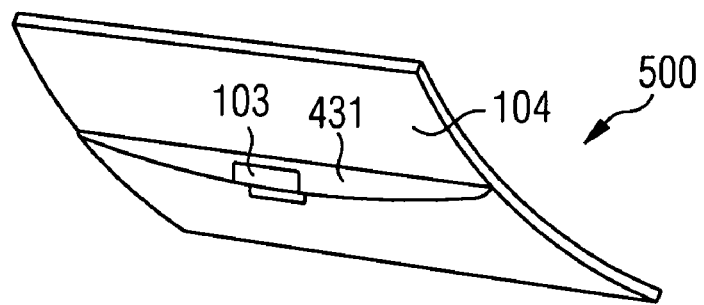
FIG. 5 is a perspective diagrammatic view of a portion of a baggage compartment, which is visible to passengers, according to a seventh embodiment of the invention.
Figure 6:
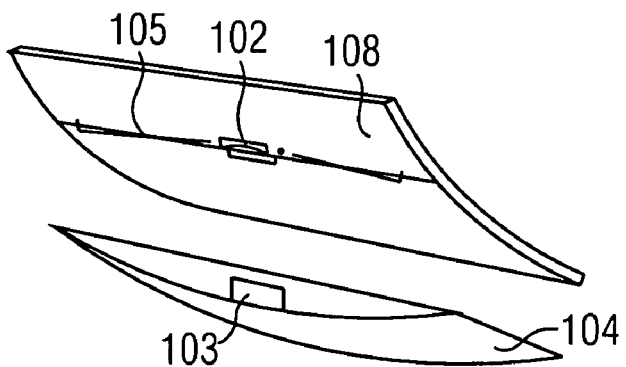
FIG. 6 is an exploded view of the baggage compartment according to FIG. 5.
Figure 7:
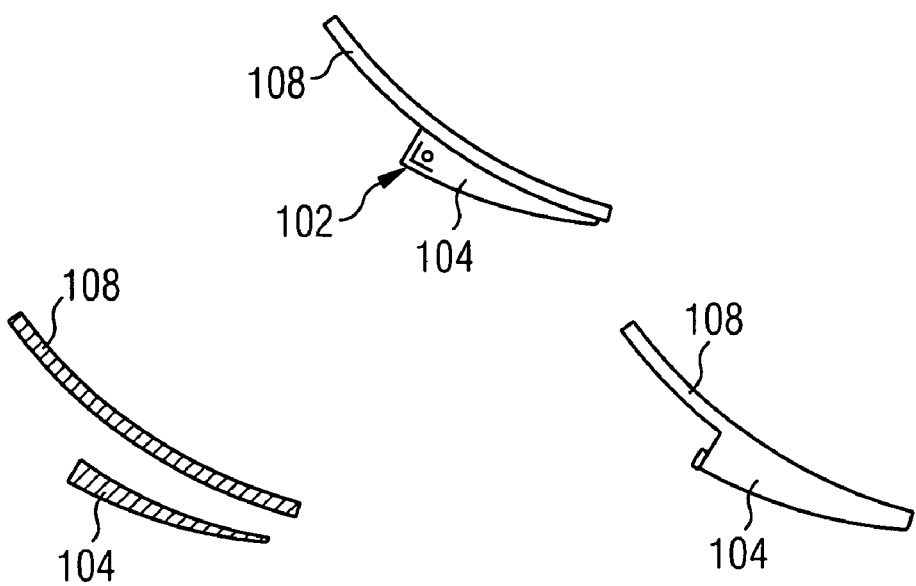
FIG. 7 is a cross-sectional views of the baggage compartment according to FIG. 5.

FIGS. 5 to 7 show perspective top views, an exploded view and cross-sectional views of the portion of a baggage compartment 500, which is visible to passengers, according to a seventh embodiment of the invention, in which an operating element 103 may be housed in a depression 431. The customized covering element may be placed on the hinged cover 108.

In one example, the latching mechanism 102 with a rod 105 may be hidden underneath the customized covering element 104 and is exposed when the customized covering element is removed. Additionally, when the customized covering element is in place, the operating element 103 remains accessible to the user so the user may operate the latching mechanism that is hidden from view.

Figure 8:
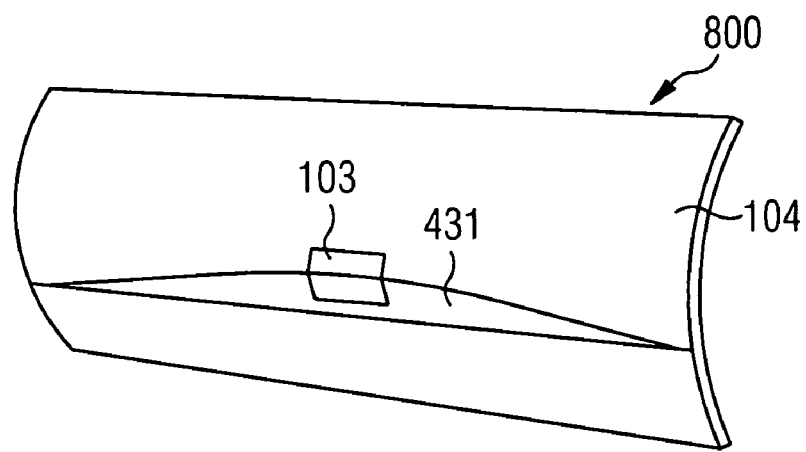
FIG. 8 is a perspective view of the part of a baggage compartment, which is visible to passengers, according to an eighth embodiment of the invention.
Figure 9:
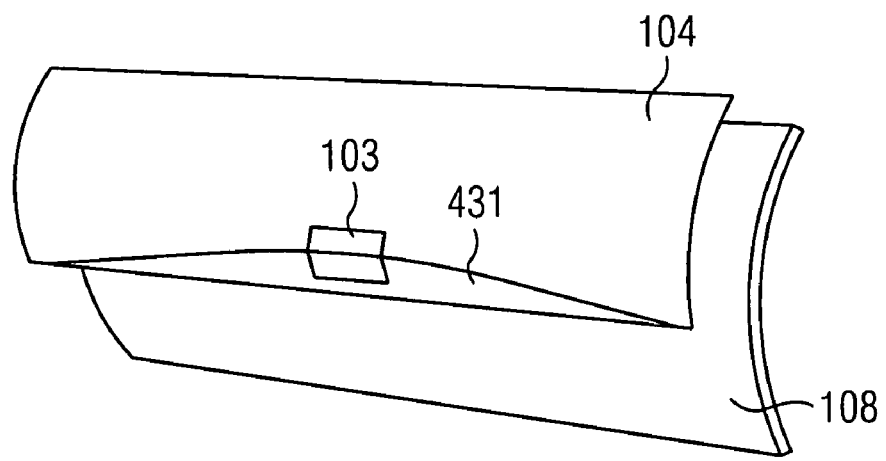
FIG. 9 is an exploded view of the baggage compartment according to FIG. 8.
Figure 10:
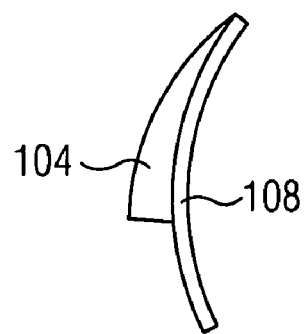
FIG. 10 is a cross-sectional view of the baggage compartment according to FIG. 8.
Figure 11:
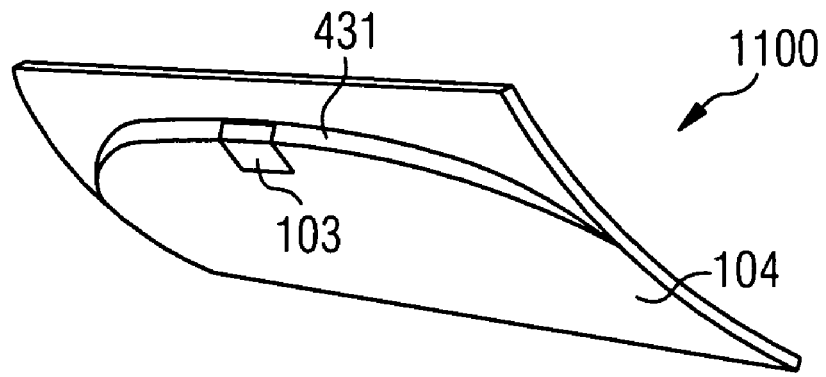
FIGS. 11 to 25 are perspective views of a portion of a baggage compartment, which is visible to passengers, according to the ninth to twenty-third embodiments of the invention. The figures partly show perspective views of baggage compartments 1100 to 2500.
Figure 12:
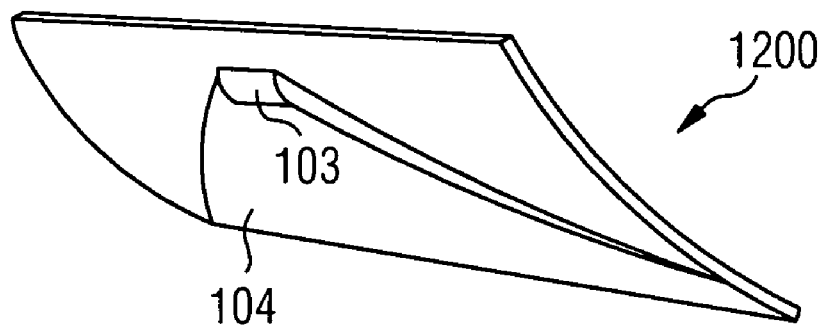
Figure 13:
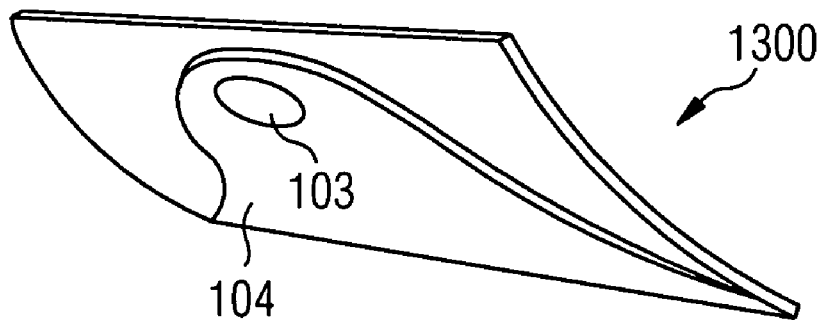
Figure 14:
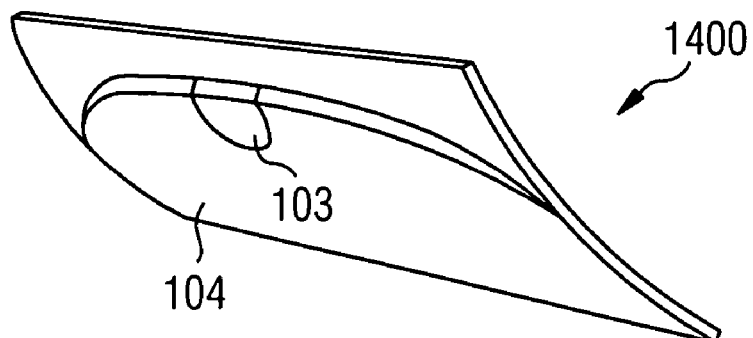
Figure 15:
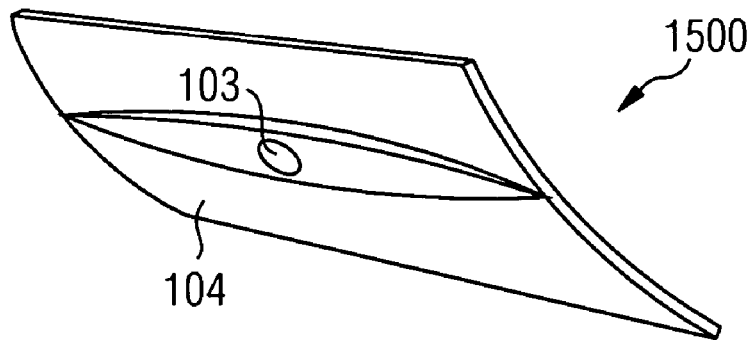
Figure 16:
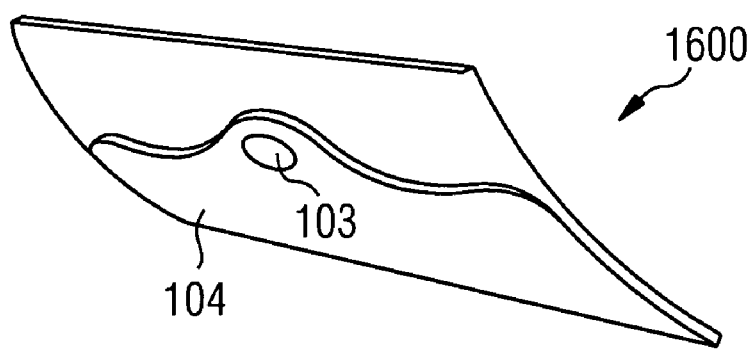
Figure 17:
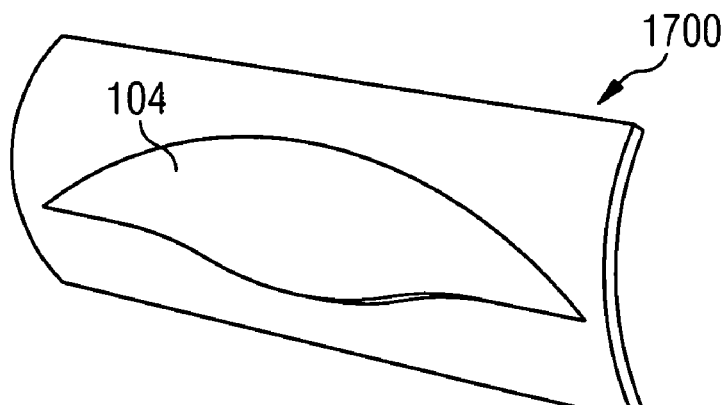
Figure 18:
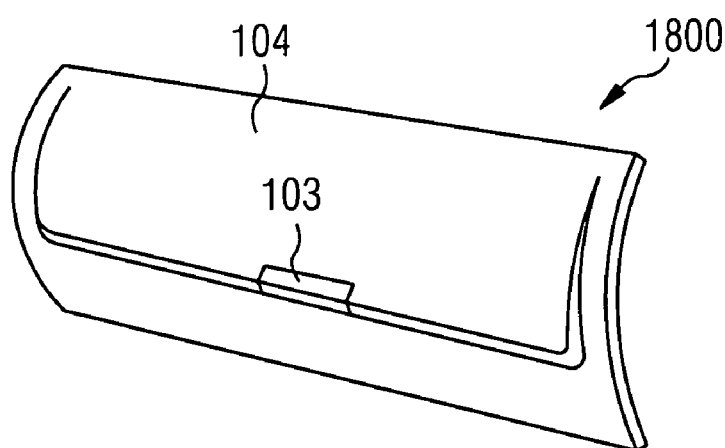
Figure 19:
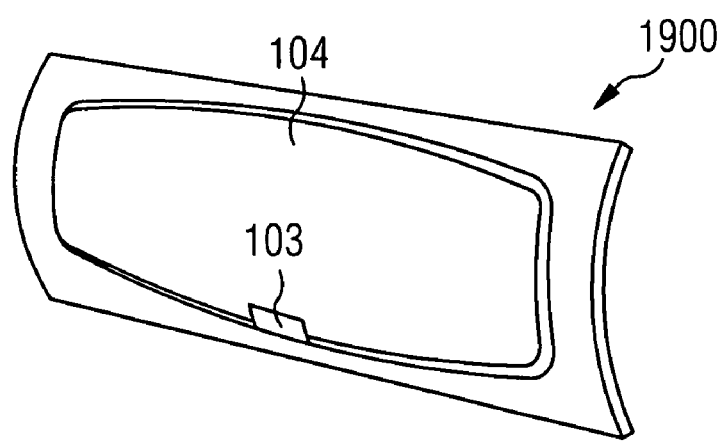
Figure 20:
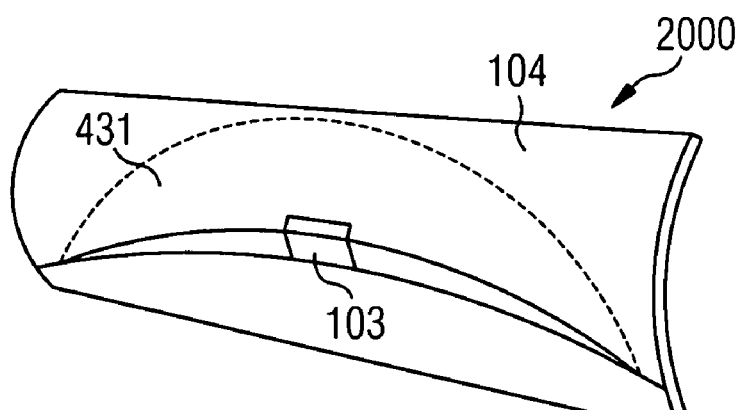
Figure 21:
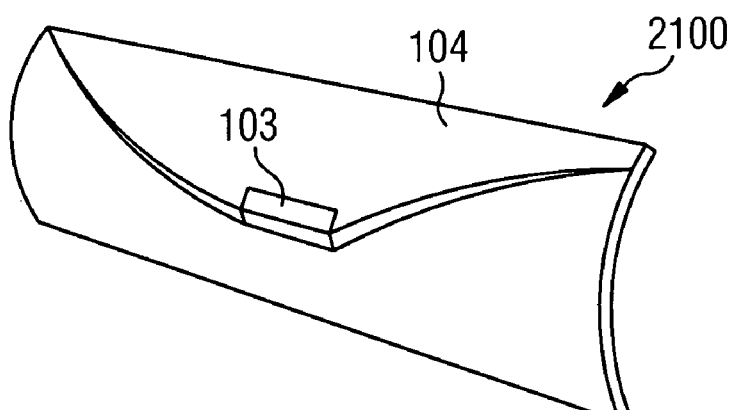
Figure 22:
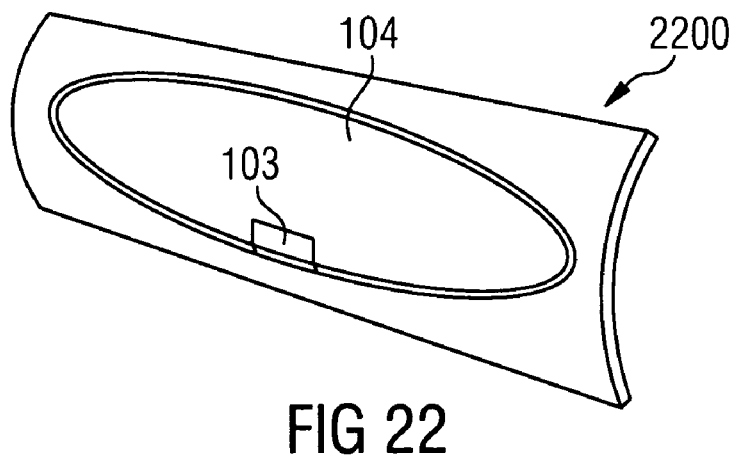
Figure 23:
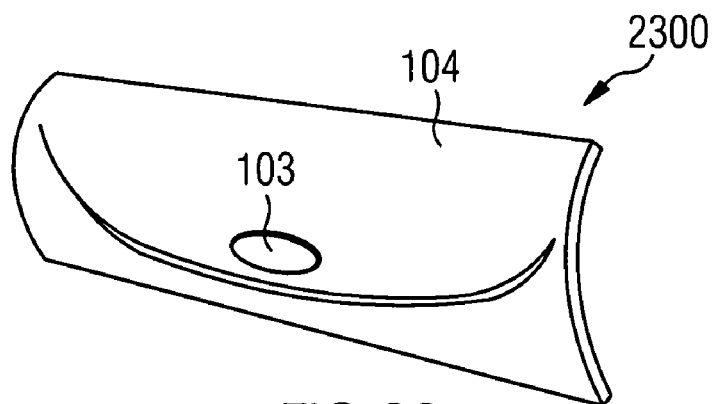
Figure 24:
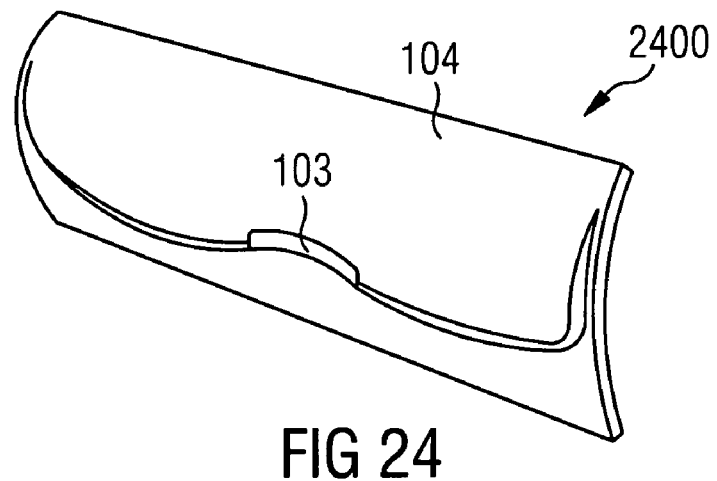
Figure 25:
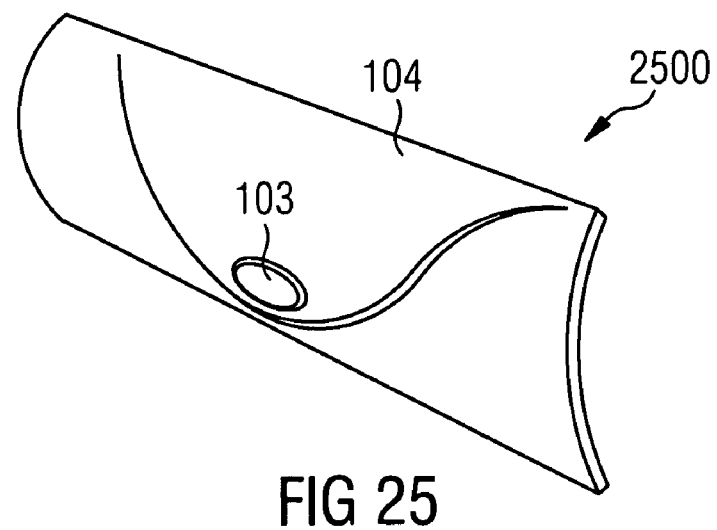

FIGS. 8 to 10 show a baggage compartment 800 according to an eight embodiment of the invention. The baggage compartment 800 may include a bottom that is not lowered. In FIG. 9, a partly-exploded view depicts a customized covering element 104 which has been removed in order to expose the hinged cover 108, which also serves as a load-bearing element as this embodiment does not include a bottom base.

In FIGS. 11 to 25, different geometric embodiments of the surface of the covering element 104 are shown with different curvatures, three-dimensional structures, decorative elements, etc.

It should be noted that the term "comprising" does not exclude other elements or steps and the "a" or "an" does not exclude a plurality. Also elements described in association with different embodiments may be combined.

It should also be noted that reference signs in the claims shall not be construed as limiting the scope of the claims.

Implementation of the invention is not limited to the preferred embodiments shown in the figures. Instead, multiple variations are possible and will be readily apparent based on the examples described herein.

LIST OF REFERENCE NUMERALS

100 Baggage compartment
101 Housing
102 Latching mechanism
103 Operating element
104 Customised covering element
105 Guide rod
106 Lever hook
107 Pin in housing
108 Cover
109 Baggage accommodation space
110 Depression
111 Direction of movement
112 Hinge position
300 Baggage compartment
301 Chute
302 Symmetry axis
400 Baggage compartment
410 Baggage compartment
420 Baggage compartment
430 Baggage compartment
431 Curvature
500 Portion of a baggage compartment that is visible to a passenger
800 Portion of a baggage compartment that is visible to a passenger 1100 Portion of a baggage compartment that is visible to a passenger
1200 Portion of a baggage compartment that is visible to a passenger
1300 Portion of a baggage compartment that is visible to a passenger
1400 Portion of a baggage compartment that is visible to a passenger
1500 Portion of a baggage compartment that is visible to a passenger
1600 Portion of a baggage compartment that is visible to a passenger
1700 Portion of a baggage compartment that is visible to a passenger
1800 Portion of a baggage compartment that is visible to a passenger
1900 Portion of a baggage compartment that is visible to a passenger
2000 Portion of a baggage compartment that is visible to a passenger
2100 Portion of a baggage compartment that is visible to a passenger
2200 Portion of a baggage compartment that is visible to a passenger
2300 Portion of a baggage compartment that is visible to a passenger
2400 Portion of a baggage compartment that is visible to a passenger
2500 Portion of a baggage compartment that is visible to a passenger

What is claimed:

1. A baggage compartment, comprising
a housing having a baggage accommodation space;
a hinged cover coupled to the housing and the hinged cover having an exterior surface facing away from the baggage accommodation space of the housing;
a latching mechanism comprising a rod, a hook and a pin, the rod being mounted on the exterior surface of the hinged cover, and the pin being mounted on the housing such that the hook extends from the rod and latches the pin when the hinged cover is latched;
an operating element operatively coupled to the rod; and
a covering element mounted to the exterior surface of the hinged cover such that the covering element covers the rod and leaves at least a portion of the operating element operatively exposed such that the operating element may be operated to unlatch the latching mechanism when the covering element is mounted to the exterior surface of the hinged cover,
wherein by moving the hinged cover, the baggage accommodation space may be made accessible or inaccessible, selectively.

2. The baggage compartment of claim 1,
wherein the hinged cover is a hat rack cover.

3. The baggage compartment of claim 1,
wherein the baggage accommodation space is made accessible by vertically moving at least one component of the baggage compartment.

4. The baggage compartment of claim 1,
wherein the baggage accommodation space is made accessible by moving the hinged cover and the housing is immovable in a vertical direction.

5. The baggage compartment of claim 1,
wherein the operating element comprises a mechanically operable push button or a non-contact operable sensor.

6. The baggage compartment of claim 1,
wherein the covering element further includes a recess such that the operating element may be accessible.

7. The baggage compartment of claim 1,
wherein the covering element further includes a depression wherein the operating element may be made accessible.

8. The baggage compartment of claim 1,
wherein the covering element comprises a surface region that faces away from the hinged cover.

9. The baggage compartment of claim 8, wherein the surface region has a three-dimensional curvature.

10. The baggage compartment of claim 1,
wherein the covering element further includes a decorative design element.

11. The baggage compartment of claim 10,
wherein the decorative design element includes an element that identifies a particular business.

12. The baggage compartment of claim 10,
wherein the covering element is placed on the hinged cover in such a way that the covering element need not have a supporting function.

13. The baggage compartment of claim 1,
wherein the covering element includes a soft material.

14. The baggage compartment of claim 1,
wherein the covering element includes at least one illumination element.

15. The baggage compartment of claim 1,
wherein the covering element is attached to the hinged cover using connection technology selected from the group consisting of an adhesive connection, a clip-on connection, an ultrasonic-welding connection and a plug-type connection.

16. The baggage compartment of claim 1,
wherein the covering element is made from a material from the group consisting of a translucent material, a tactile material, and a material with variable optical characteristics.

17. The baggage compartment of claim 1,
wherein the covering element includes an electronic display device or an acoustic playback device.

18. An aircraft comprising the baggage compartment of claim 1.

19. A method for producing a baggage compartment of claim 1, the method comprising:
forming a housing with a baggage accommodation space;
mounting a hinged cover on the baggage accommodation space such that by moving the hinged cover, the baggage accommodation space is made selectively accessible or inaccessible;
mounting the rod of the latching mechanism on the external surface of the hinged cover such that by operating the operating element, the hinged cover and the housing may be selectively latched or unlatched;
mounting a covering element to the hinged cover such that it covers the rod and leaves the operating element accessible such that the operating element is capable of operably latching and unlatching the latching mechanism when the covering element is mounted to the hinged cover.

20. A system of using a baggage compartment of claim 1 in a passenger transport system.

21. The system of claim 20, wherein the passenger transport system is a vehicle or an aircraft.

* * * * *